July 16, 1968
B. V. ELLIOTT
3,392,898
DOUBLE JOINTING PIPE RACK
Filed Sept. 21, 1966
3 Sheets-Sheet 1
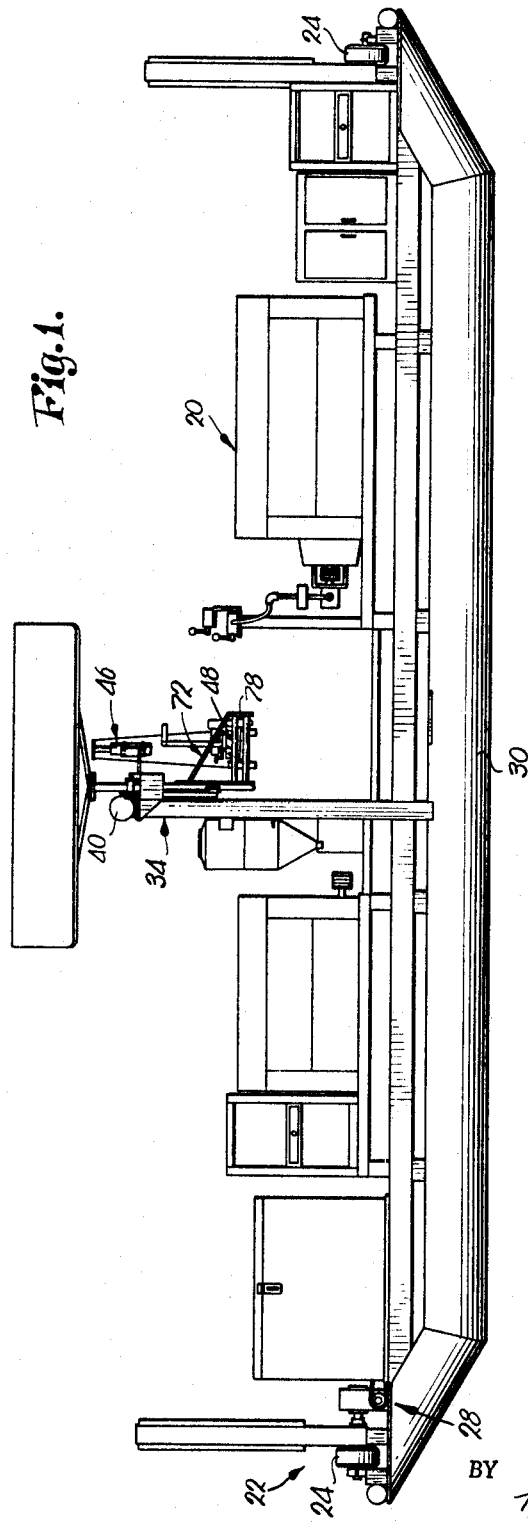
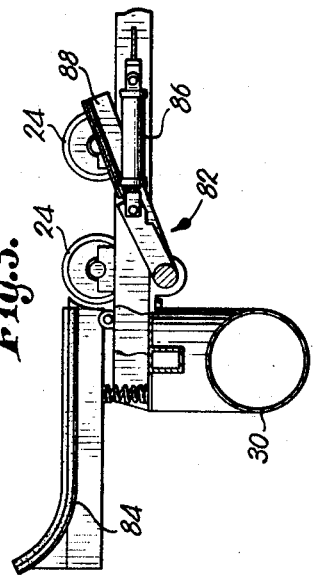
INVENTOR
Bernard V. Elliott
BY
ATTORNEYS.

July 16, 1968
B. V. ELLIOTT
3,392,898
DOUBLE JOINTING PIPE RACK
Filed Sept. 21, 1966
3 Sheets-Sheet 2
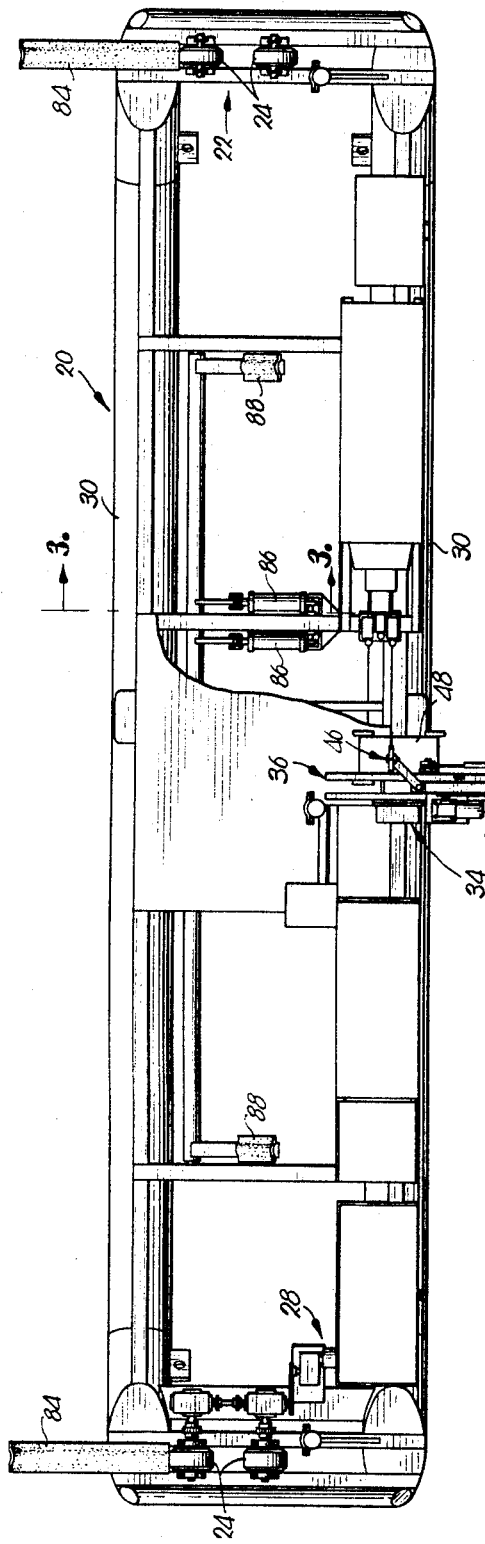
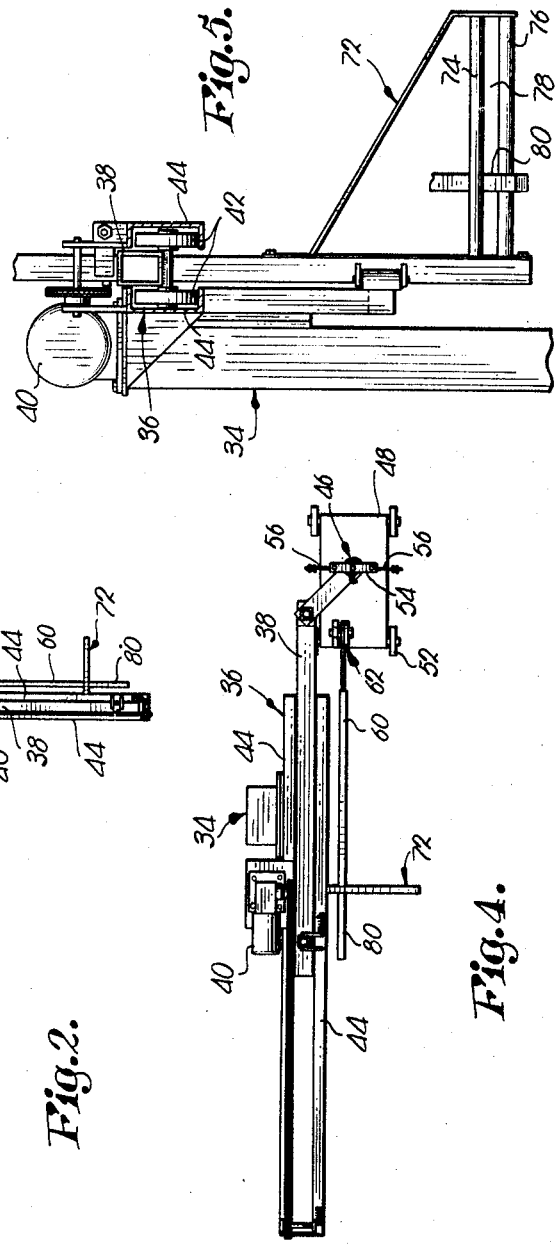
INVENTOR
Bernard V. Elliott
BY
*Hovey, Schmidt, Johnson & Hovey*
ATTORNEYS.

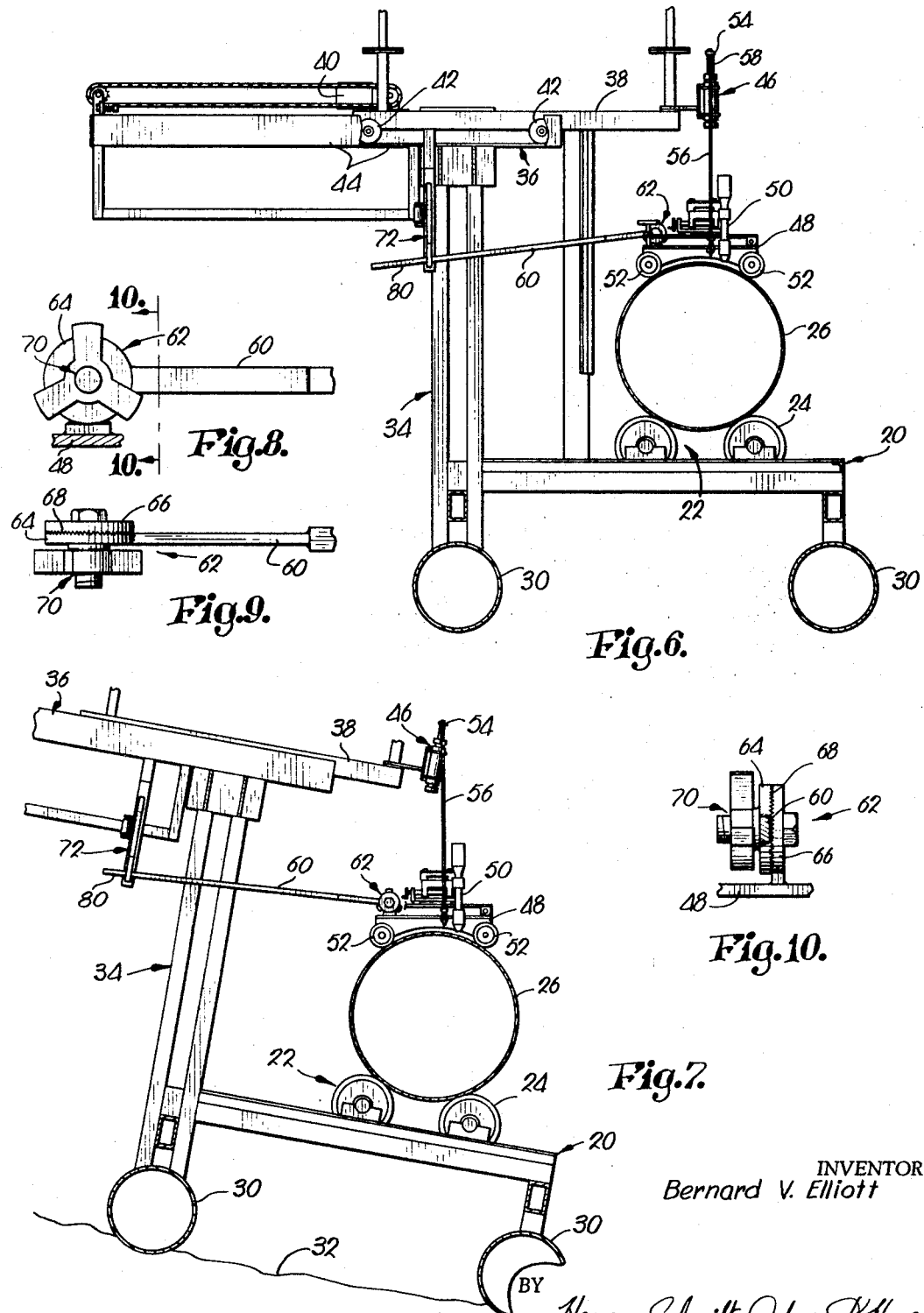

United States Patent Office 3,392,898
Patented July 16, 1968

3,392,898
DOUBLE JOINTING PIPE RACK
Bernard V. Elliott, Anderson, Mo., assignor to H. C. Price Company, Bartlesville, Okla., a corporation of California
Filed Sept. 21, 1966, Ser. No. 581,012
13 Claims. (Cl. 228—48)

This invention relates to a welding rack for double-jointing pipe, and particularly, to a dolly control for maintaining a welding head support dolly in a predetermined position with respect to the proximal edges of a pair of pipe joints being welded together.

Pipe is generally manufactured in the form of relatively short lengths (commonly referred to as joints of pipe by those skilled in the art) to facilitate handling and shipping of the same by conventional methods. The individual joints are welded together in end-to-end relationship to form a pipeline.

It has been suggested that pipeline construction costs might be reduced by utilizing automatic welding procedures in lieu of traditional hand-welding techniques. Although large diameter pipe cannot be handled readily in long lengths, it is possible to handle lengths of two or more joints welded together. This procedure has become known as "double jointing." Manifestly, the "double" joints (comprising at least two and possibly more lengths of pipe) are placed in position and hand-welded to the end of the pipeline as the latter grows.

Automatic welding procedures, while faster than hand-welding, require special care and control to insure the production of an acceptable seam. A double jointing welder may be provided with a mobile dolly for supporting the welding head in the proper position. Such a dolly is adapted for riding on the periphery of the pipe, at a fixed location relative to the support assembly of the welder, as the pipe rotates about its longitudinal axis therebeneath. The dolly must be maintained in the proper position with respect to the pipe being welded and, in the past, the dolly has been rigidly attached to the welder support assembly to assure positive control of the placement thereof.

Therefore, it is the primary object of the instant invention to provide a dolly control for a welder of the type described, wherein is included means on the dolly engageable with a reference point on the assembly for maintaining the dolly in a proper welding disposition and wherein the dolly is not attached to the support assembly, whereby the position of the dolly may be expeditiously adjusted over a wide range and yet positive positioning of the same is achieved at all times.

Transportation of double-jointed pipe is difficult, requiring special equipment and often, special highway permits. As a result, it would be preferable to double-joint pipe at a location close to the point of installation of the same. However, because automatic welding requires close control of the disposition of the welding dolly, double-jointing welders, in the past, have not been thought suitable for installation in the field where the attitude of the welder support assembly would vary. Thus, another very important object of the instant invention is the provision of a portable, double-jointing welder having a dolly control which permits proper positioning of the dolly regardless of the attitude of the support assembly whereby the welder may be installed on an uneven surface such as the ground adjacent a pipeline ditch, and yet, the disposition of the dolly is properly maintained.

A further important object of the instant invention is the provision of releasable means for securing the dolly to the support assembly so that the position of the dolly relative to the support assembly may be selectively altered to accommodate proper placement of the dolly with respect to the pipe, regardless of the attitude of the assembly.

Still another important object of the instant invention is the provision of relatively engageable structure whereby the dolly may be shifted longitudinally of the pipe and yet remain operably associated with the support structure to maintain the dolly in proper angular disposition with respect to the pipe.

Still another important object of the present invention is the provision of a dolly crane including an overhead beam shiftable on the assembly transversely of the pipe, power means carried by the beam for raising and lowering the dolly, and flexible means for suspending the dolly from the power means so that the dolly may be properly positioned on the pipe regardless of the attitude of the support assembly. Manifestly, it is another aim of the invention to provide an arm swingable with the dolly, and a shoulder engageable with the arm to prevent movement of the same and thereby the dolly, wherein the arm is shiftable with respect to the shoulder during operation of the dolly crane, whereby the dolly may be lifted from the pipe after welding of the latter has been completed to permit removal of the double-jointed pipe and insertion of a pair of individual joints to be welded without altering the adjustment of the arm with respect to the dolly.

Yet an additional object of the invention is to provide a welder of the type described wherein the arm-engageable shoulder is carried by the extendible, retractable beam for movement therewith toward and away from the pipe to the end that the operative relationship between the shoulder and the arm remains unaltered during extension and retraction of the beam.

Other objects will become apparent as the following specification proceeds.

In the drawings:

FIGURE 1 is a side elevational view of a portable, double-jointing pipe rack embodying the principles and concepts of the instant invention;

FIG. 2 is a top plan view of the assembly illustrated in FIG. 1;

FIG. 3 is a detail view taken along line 3—3 of FIG. 2;

FIG. 4 is an enlarged plan view of the dolly control and dolly crane similar to the view of the same shown in FIG. 2, with the crane beam in its extended position;

FIG. 5 is an enlarged elevational, fragmentary, detail view of the arm-engaging shoulder structure;

FIG. 6 is an enlarged, sectional view, parts appearing in elevation, looking to the left at the assembly shown in FIG. 1;

FIG. 7 is a view similar to FIG 6 with the welder assembly disposed on uneven terrain and thereby maintained in a tilted attitude;

FIG. 8 is an enlarged, elevational, detail view of the clamp means mounting the arm on the dolly.

FIG. 9 is a plan view looking downwardly at the clamp means illustrated in FIG. 8; and FIG. 10 is a sectional view taken along line 10—10 of FIG. 8.

A portable welder in the nature of a double-jointing pipe rack embodying the principles and concepts of the instant invention is illustrated in FIGS. 1, 2, 6 and 7 and broadly designated by the numeral 20. Rack 20 includes a support assembly 22 having pipe-engaging rollers 24 thereon. Rollers 24 are disposed for maintaining a pair of pipe joints 26 in longitudinally aligned, end-to-end relationship (the joints are not shown in FIGS. 1 and 2 and because they are longitudinally aligned, only one appears in FIGS. 6 and 7) while drive means broadly designated by the numeral 28 rotates the rollers 24 at the left end of the assembly 22 as can be seen viewing FIGS. 1 and 2. It is to be understood that the individual pipe joints 26 have their proximal ends maintained in proper alignment by tack welding or with a connector of the type well known to those skilled in the art and, therefore, the two joints are rotatable as a single unit. Thus, upon rotation of the rollers 24 at the left end of assembly 22, both joints are rotated simultaneously about their longitudinal axes. Rack 20 includes ground-engaging skids 30 adapting rack 20 for placement on an uneven surface 32 as illustrated in FIG. 7.

Assembly 22 includes superstructure 34 extending upwardly from skids 30. A dolly crane 36 is mounted on superstructure 34 and has an extendible-retractable beam 38 shiftable transversely of the longitudinal axis of joints 26 thereabove. Prime mover means in the nature of a small motor 40 is provided at the upper end of superstructure 34 for selectively extending or retracting beam 38, while the latter is supported by the cooperation of wheels 42 rotatably carried by beam 38 with track 44 supported on superstructure 34 as can best be seen viewing FIG. 4. Power means in the nature of a piston and cylinder assembly 46 is carried on the free end of beam 38 for raising and lowering a dolly 48, the latter carrying a welding head 50 in a position for normally welding a circumferential seam between joints 26 as the latter are rotated and after dolly 48 has been lowered by power means 46 into the welding disposition illustrated in FIGS. 6 and 7. It is to be noted that dolly 48 is provided with rotatable means 52 for supporting dolly 48 on the pipe joints 26 as the latter rotate therebeneath.

Piston and cylinder assembly 46 includes a crossbar 54 at the upper end of the piston, and suspension means in the nature of a pair of flexible cables 56 are attached between respective opposite ends of crossbar 54 and corresponding opposite sides of the dolly 48 as best illustrated in FIG. 4. Thus, it can be seen that as the piston rod 58 of piston and cylinder assembly 46 is extended, dolly 48 is lifted from pipe joints 26. Conversely, as rod 58 is retracted, dolly 48 is lowered onto pipe joints 26.

An elongated arm 60 extends outwardly from dolly 48 in a lateral direction with respect to the longitudinal axis of joints 26. Arm 60 is disposed for swinging movement within a plane substantially normal to the longitudinal axis of joints 26 in response to the tendency of dolly 48 to travel circumferentially of joints 26. Releasable means 62 are provided for securing arm 60 to dolly 48. Means 62 includes a circular plate 64 rigid with arm 60 and a similar plate 66 rigid with dolly 48. Plates 64 and 66 have interengageable, serrated faces 68 which are intermeshed upon tightening of bolt and nut means 70 for maintaining arm 60 in a predetermined, fixed relationship with respect to dolly 48. Manifestly, upon loosening of bolt and nut means 70, faces 68 are disengageable to permit swinging of arm 60 about the axis of bolt and nut means 70 relative to dolly 48.

Rack 20 is provided with shoulder structure 72 for engaging arm 60 and holding the latter against movement with dolly 48 around the longitudinal axis of joints 26. Structure 72 includes a pair of spaced-apart, elongated, generally parallel shoulder elements 74 and 76. Elements 74 and 76 define an elongated slot 78 therebetween receiving the free end of arm 60 therein. Arm 60 and structure 72 provide a dolly control for maintaining dolly 48 in a predetermined disposition with respect to joints 26 and during the welding of the latter.

It is to be understood that while dolly 48 is illustrated in a substantially horizontal position, the attitude thereof relative to the axis of pipe joints 26 may be tilted slightly in one direction or the other around the circumference of joints 26, depending on the requirements of the particular welding operation. Rotatable means 52 remain in engagement with the periphery of joints 26 so that head 50 may be maintained in properly spaced relationship with respect to the periphery. Thus, dolly 48 may tend to move clockwise or counterclockwise around the axis of joints 26 during the welding operation, depending on the requirements of the latter. Additionally, it is to be understood that dolly 48 will tend to move with joints 26 in the direction the latter are rotated. Thus, it is desirable to provide a pair of spaced elements such as 74 and 76 so that the tendency of arm 60 to swing in either direction may be counteracted. Furthermore, the final placement of dolly 48 relative to joints 26 may require dolly 48 to be shifted slightly in a direction longitudinally of the axis of joints 26. It can be seen viewing FIGS. 1 and 5, that slot 78 is elongated in a direction parallel to the axis of rotation of joints 26 and, therefore, end 80 of arm 60 may be shifted longitudinally in slot 78 to permit shifting of dolly 48 along the length of joints 26.

Viewing FIG. 6, rack 20 is illustrated in the attitude assumed when skids 30 rest on a substantially horizontal surface. Releasable means 62 has been adjusted so that arm 60 extends outwardly from dolly 48 at an angle for maintaining dolly 48 in the proper welding position when end 80 of arm 60 engages structure 72. Joints 26 are rotated while the seam therebetween is welded by welding head 50. Upon completion of a weld, piston and cylinder assembly 46 is actuated to extend rod 58 and thereby lift dolly 48 from joints 26. It can be seen that end 80 will pivot within slot 78 so that nut and bolt means 70 do not have to be loosened. After dolly 48 has been raised sufficiently far to clear joints 26, pipe removal mechanism 82 is actuated to move the double-jointed section from rollers 24 onto platforms 84. Viewing FIG. 3, it can be seen that mechanism 82 includes hydraulic piston and cylinder means 86 operable to swing bumper means 88 on rack 20 to thereby push a pipe from rollers 24 leftwardly.

After the removal of the previously welded joints 26 from rack 20, another pair of similar joints 26 are placed on rollers 24 and connected in the manner hereinabove described. After joints 26 are positioned on rollers 24, piston and cylinder assembly 46 is again actuated to retract rod 58 and thereby lower dolly 48 onto joints 26. It is to be understood that dolly 48 may require slight shifting in a direction longitudinally of the joints 26 to place head 50 into proper relationship with respect to the seam to be welded. Cables 56, being flexible, permit such longitudinal shifting and, as mentioned previously, the configuration of slot 78 permits arm 60 to shift with dolly 48. Manifestly, for a given pipeline, the joints to be welded will be of a consistent diameter and, therefore, once the releasable means 62 have been properly adjusted, no further adjustment will be required. On the other hand, it is clear that for welding joints of differing diameters, releasable means 62 must be adjusted to permit arm 60 to shift relative to dolly 48 until the latter is disposed in the proper position, whereupon releasable means 62 is once again tightened to maintain arm 60 in fixed, predetermined relationship with respect to dolly 48.

Referring to FIG. 7, rack 20 is shown in the position it would attain while resting on an inclined surface such as 32. The position of dolly 48 with respect to a vertical plane extending through joints 26 is the same in FIG. 7 as it was in FIG. 6. However, it can be seen that beam 38 must be retracted so that crossbar 54 is positioned substantially directly above the center of joints 26. Dolly 48 is suspended by flexible cables 56 and, therefore, hangs beneath bar 54. Thus, the relative position of dolly 48 with respect to structure 72 is different than that illustrated in FIG. 6. To accommodate this different position, means 62 is released, whereupon arm 60 is shifted with respect to dolly 48 to assume the position relative thereto as shown in FIG. 7. After the proper position of arm 60 has been determined, releasable means 62 is tightened to fix the relative positions of arm 60 and dolly 48. Once again, shoulder elements 74 and 76 will preclude the swinging of end 80 of arm 60 about the longitudinal axis of joints 26 and thereby maintain dolly 48 in a fixed position relative to joints 26 as the latter rotate.

Structure 72 is carried on beam 38 for shifting therewith toward and away from joints 26. After dolly 48 has been raised from the surface of joints 26 by piston and cylinder assembly 46, beam 38 may be shifted without altering the relationship between end 80 of arm 60 and shoulder elements 74 and 76. Thus, if lateral movement of dolly 48 is required to clear joints 26 and permit their removal from rack 20, this movement may be accomplished without disturbing the alignment of the dolly control, and upon placement of the next joints to be welded on rack 20, dolly 48 may be readily placed thereon without the need for further adjustment of releasable means 62.

The novel dolly control of the instant invention including an arm such as 60 engageable with a structure such as 72, permits a dolly such as 48 to be maintained in a fixed position relative to joints of pipe such as 26 without dolly 48 being rigidly connected with the rack 20. Furthermore, releasable means 62 provides rapid adjustment for maintaining dolly 48 in a correct welding attitude regardless of the disposition of rack 20. Hence, it can be seen that all of the objects, aims and purposes of the present invention as expressed and implied in the foregoing specification, have been fulfilled in a substantial sense.

Having thus described the invention, what is claimed as new and desired to be secured by Letters Patent is:

1. In a welder having an assembly engageable with the side of a pipe to be welded for supporting the same therebeneath, said assembly including means for rotating the pipe about its longitudinal axis and a dolly provided with a welding head and with means for supporting the dolly on the pipe, a dolly control comprising:
   an arm having means securing the same to the dolly, said arm extending outwardly beyond the dolly and being disposed for swinging movement within a plane substantially normal to said axis in response to the tendency of said dolly to travel circumferentially of the pipe; and
   structure engaging the arm for holding the same against said movement, whereby to prevent said travel of the dolly and thereby maintain the head in a fixed position with respect to the pipe during rotation of the latter.

2. The invention of claim 1,
   said assembly being portable,
   said structure being mounted on the assembly,
   said means securing the arm to the dolly being releasable, rendering the arm shiftable within said plane to a number of preselected positions relative to the dolly whereby to accommodate for changes in the attitude of the assembly as the result of differences in the slope of the terrain.

3. The invention of claim 2,
   said means securing the arm to the dolly comprising a pair of plates on said arm and said dolly respectively, said plates each having a serrated face, there being bolt and nut means clamping said plates together with said serrated faces intermeshed.

4. The invention of claim 1,
   said dolly being shiftable in a direction longitudinal of said pipe,
   said structure having an elongated shoulder engaging said arm and extending generally parallel to the path of travel of said dolly as the latter is shifted longitudinally of the pipe for accommodating said shifting while remaining in operative relationship with respect to the arm.

5. The invention of claim 1,
   said structure having spaced shoulders for engaging the arm,
   said arm being disposed between said shoulders for alternately engaging the latter to prevent circumferential movement of the dolly in corresponding opposite directions.

6. The invention of claim 2,
   said structure including a pair of spaced, elongated, generally parallel shoulder elements disposed to present a slot therebetween extending substantially parallel to the axis of rotation of said pipe,
   said arm being received in said slot,
   said dolly being shiftable longitudinally of the pipe with said arm in said slot.

7. In a welder having an assembly engageable with the side of a pipe to be welded for supporting the same therebeneath, said assembly including means for rotating the pipe about its longitudinal axis and a dolly provided with a welding head and with means for supporting the dolly on the pipe, a dolly crane comprising:
   a beam shiftable on the assembly transversely of the pipe thereabove when the latter is supported by the assembly;
   power means carried by the beam for raising and lowering the dolly;
   means suspending the dolly from said power means including flexible means permitting alteration of the position of the dolly with respect to the pipe, longitudinally of the latter.

8. The invention of claim 7, and a dolly control comprising:
   an arm having means securing the same to the dolly, said arm extending outwardly beyond the dolly and being disposed for swinging movement within a plane substantially normal to said axis in response to the tendency of said dolly to travel circumferentially of the pipe; and
   structure engaging the arm for holding the same against said movement, whereby to prevent said travel of the dolly and thereby maintain the head in a fixed position with respect to the pipe during rotation of the latter,
   said arm being shiftable relative to said structure during operation of said crane, clearing the dolly for altering the position of the welding head relative to the pipe.

9. The invention of claim 8,
   said structure being mounted on said beam for movement therewith toward and away from said pipe whereby said arm and said structure remain in fixed relative positions during movement of the beam.

10. The invention of claim 9,
    said dolly being shiftable in a direction longitudinal of said pipe,
    said structure having an elongated shoulder engaging said arm and extending generally parallel to the path of travel of said dolly as the latter is shifted longitudinally of the pipe for accommodating said shifting while remaining in operative relationship with respect to the arm.

11. The invention of claim 7,
    said beam being extendible and retractable, there being provided prime mover means for selectively extending or retracting the beam.

12. The invention of claim 7,
    said power means including an upright piston and cylinder assembly, said flexible means comprising a pair of cables hanging from said piston.

13. The invention of claim 12,
said piston having a crossbar on the end thereof remote from said cylinder,
each end of said crossbar mounting a respective one of said cables, the latter being connected to respective opposite sides of the dolly.

References Cited

UNITED STATES PATENTS

| | | | |
|---|---|---|---|
| 3,095,501 | 6/1963 | Goekler | 219—124 |
| 3,324,275 | 6/1967 | Peignen | 219—159 |
| 3,101,530 | 8/1963 | Coscia | 228—48 |

RICHARD H. EANES, Jr., *Primary Examiner.*